US008543378B1

(12) United States Patent
Westphal

(10) Patent No.: US 8,543,378 B1
(45) Date of Patent: Sep. 24, 2013

(54) SYSTEM AND METHOD FOR DISCERNING A TERM FOR AN ENTRY HAVING A SPELLING ERROR

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 2969 days.

(21) Appl. No.: 10/702,385

(22) Filed: Nov. 5, 2003

(51) Int. Cl.
  *G06F 17/27* (2006.01)
(52) U.S. Cl.
  USPC .................................................. 704/9; 704/10
(58) Field of Classification Search
  USPC ........................................ 704/9, 10; 715/533
  See application file for complete search history.

(56) References Cited

U.S. PATENT DOCUMENTS

| | | | |
|---|---|---|---|
| 4,355,371 A | 10/1982 | Convis et al. | |
| 4,580,241 A | 4/1986 | Kucera | |
| 5,258,909 A | 11/1993 | Damerau et al. | |
| 5,521,816 A * | 5/1996 | Roche et al. | 704/9 |
| 5,572,423 A | 11/1996 | Church | |
| 5,604,897 A | 2/1997 | Travis | |
| 5,659,771 A | 8/1997 | Golding | |
| 5,765,180 A | 6/1998 | Travis | |
| 5,907,839 A | 5/1999 | Roth | |
| 6,131,102 A * | 10/2000 | Potter | 715/533 |
| 6,144,958 A | 11/2000 | Ortega et al. | |
| 6,347,296 B1 * | 2/2002 | Friedland | 704/231 |
| 6,360,197 B1 * | 3/2002 | Wu et al. | 704/9 |
| 6,401,084 B1 | 6/2002 | Ortega et al. | |
| 6,470,347 B1 * | 10/2002 | Gillam | 707/101 |
| 6,556,841 B2 | 4/2003 | Yu | |
| 6,560,559 B2 * | 5/2003 | Sagar | 702/150 |
| 6,616,704 B1 | 9/2003 | Birman et al. | |
| 6,618,697 B1 * | 9/2003 | Kantrowitz et al. | 703/22 |
| 6,848,080 B1 * | 1/2005 | Lee et al. | 715/533 |
| 7,031,911 B2 * | 4/2006 | Zhou et al. | 704/10 |
| 7,080,005 B1 * | 7/2006 | Kao | 704/10 |
| 7,089,188 B2 * | 8/2006 | Logan et al. | 704/270 |
| 7,149,970 B1 * | 12/2006 | Pratley et al. | 715/533 |
| 7,165,019 B1 * | 1/2007 | Lee et al. | 704/2 |
| 7,181,388 B2 * | 2/2007 | Tian | 704/10 |
| 2002/0010726 A1 | 1/2002 | Rogson | |
| 2002/0173966 A1 * | 11/2002 | Henton | 704/277 |
| 2003/0037077 A1 * | 2/2003 | Brill et al. | 707/533 |
| 2003/0101044 A1 * | 5/2003 | Krasnov | 704/4 |
| 2003/0120482 A1 * | 6/2003 | Tian | 704/209 |
| 2003/0139921 A1 * | 7/2003 | Byrd et al. | 704/10 |
| 2003/0145285 A1 | 7/2003 | Miyahira et al. | |
| 2003/0187649 A1 * | 10/2003 | Logan et al. | 704/260 |
| 2004/0019697 A1 | 1/2004 | Rose | |
| 2004/0193399 A1 * | 9/2004 | Potter et al. | 704/4 |

OTHER PUBLICATIONS

Zobel, Justin et al. "Phonetic String Matching: Lessons from Information Retrieval," 1996, Proc. of the 19th annual international ACM SIGIR conference on Research and development in information retrieval.*

* cited by examiner

*Primary Examiner* — Douglas Godbold
(74) *Attorney, Agent, or Firm* — Greenberg Traurig, LLP

(57) ABSTRACT

A system and method for discerning a term for an entry having a spelling error. The system and method generally compares a "phonetic residue" of a misspelled entry to "phonetic residues" of terms in a dictionary of commonly misspelled words. In this regard, the "phonetic residue" of an entry or term may be arrived at by considering the consonants of an entry and term (e.g., by disregarding vowels). Additionally, the comparison of "phonetic residues" may consider one or more of a leading vowel (if any), letters likely to be omitted (e.g., silent letters), and/or letters likely to be added.

17 Claims, 4 Drawing Sheets

SYSTEM AND METHOD FOR DISCERNING A TERM FOR AN ENTRY HAVING A SPELLING ERROR

BACKGROUND

The following disclosure relates generally to spell checking technologies and, more particularly, to a system and method for discerning a term for an entry having a spelling error.

In the art, systems and method for correcting spelling errors are known. For example, U.S. Pat. No. 6,144,958, entitled "System And Method For Correcting Spelling Errors In Search Queries," describes a search engine that uses correlations between search terms to correct misspelled terms within search queries. The correlations are based at least in-part on historical query submissions to the search engine. Preferably, the correlations reflect the frequencies with which the search terms have historically appeared together within the same query. In operation, when a query is submitted to the search engine, a spelling correction process accesses the correlation table to generate a list of terms that are deemed to be related to the matching term(s). The spellings of these related terms are then compared to the spelling of each non-matching term using a spelling comparison function that compares two character strings and generates a similarity score. More specifically, the spelling comparisons are performed using an ordered anagram-type spelling comparison function including all of the vowels and consonants (e.g., "Appalachian" is stored as "aaaachilnpp" for use in the comparison process). A similarity score takes into account the fact that misspellings typically result from the insertion of an extra letter, omission of a letter, and/or transposition of letters. If a suitable replacement is found for a given non-matching term, the non-matching term is replaced with the similar related term.

Still further, U.S. Pat. No. 5,765,180, entitled "Method And System For Correcting The Spelling Of Misspelled Words," describes maintaining a list or dictionary of misspelled words and associated, correctly spelled words. When a misspelled word is encountered during the spell checking of a word processing document, the system searches the list for the misspelled word. If the misspelled word is in the list, the system replaces the word in the document with the associated, correctly spelled word. The described system also provides a method for adding misspelled words and associated, correctly spelled words to the list.

SUMMARY

Described hereinafter is an improved system and method for discerning a term for an entry having a spelling error. By way of example, the term may be used as the input to a search engine in cases where a search request entry has been misspelled. To this end, the described system and method generally compares a "phonetic residue" of a misspelled entry to "phonetic residues" of terms in a dictionary of commonly misspelled words. In this regard, the "phonetic residue" of an entry or term may be arrived at by considering the consonants of the entry or term (e.g., by disregarding vowels). A "phonetic residue" comparison may also consider a leading vowel (if any), letters likely to be omitted (e.g., silent letters), and/or letters likely to be added. Filtering processes may also be utilized for the purpose of minimizing the chance of providing a false recommendation/substitution for a misspelled entry.

A better understanding of the objects, advantages, features, properties and relationships of the system and method for discerning a term for an entry having a spelling error will be obtained from the following detailed description and accompanying drawings which set forth illustrative embodiments which are indicative of the various ways in which the principles thereof may be employed.

BRIEF DESCRIPTION OF THE DRAWINGS

A system and method for discerning a term for an entry having a spelling error is described with reference to the following drawings in which.

DETAILED DESCRIPTION

Figure 1:
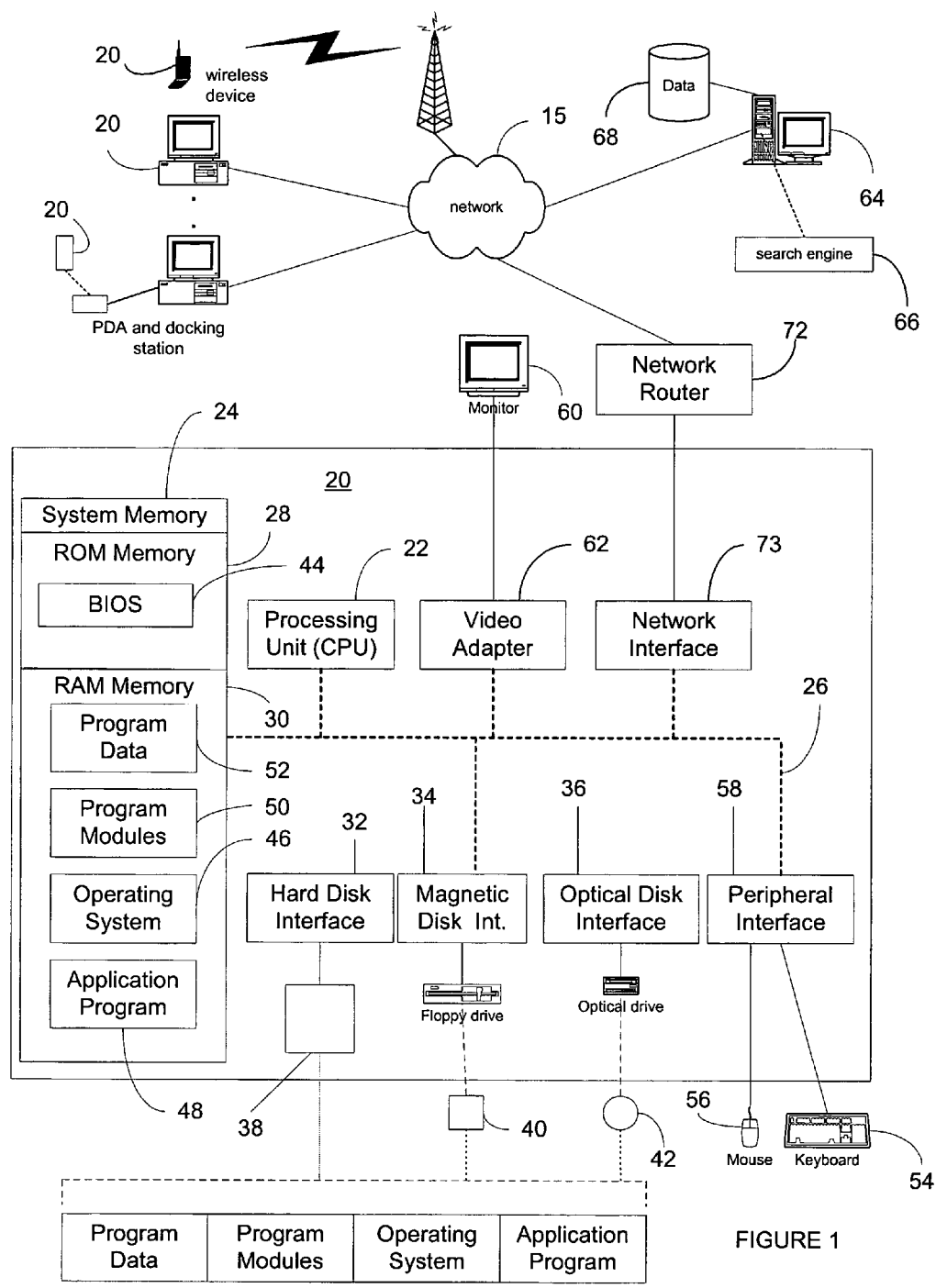
FIG. 1 illustrates a block diagram of an exemplary computer system in which the principles of the system and method for discerning a term for an entry having a spelling error may be employed.

Turning to the drawings, wherein like reference numerals refer to like elements, an exemplary system and method for discerning a term for an entry having a spelling error is described. While described in the context of a system for performing search queries, it is to be appreciated that this context is not intended to be limiting. Rather, it is contemplated that the hereinafter described methods may be utilized in connection with any system that may have a need for using a spell checking technology, e.g., a document preparation program, e-mail program, and the like.

Turning now to FIG. 1, a processing device 20, illustrated in the exemplary form of a computer system, is provided with executable instructions for discerning a term for an entry having a spelling error. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a network whereby the executable instructions may be associated with and/or executed by one or more of the multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. By way of further example, the bus 26 may include an architecture having a North Bridge and a South Bridge where the North Bridge acts as the connection point for the processing unit 22, memory 24, and the South Bridge. The North Bridge functions to route traffic from these interfaces, and arbitrates and controls access to the memory subsystem from the processing unit 22 and I/O devices. The South Bridge, in its simplest form, integrates various I/O controllers, provides interfaces to peripheral devices and buses, and transfers data to/from the North bridge through either a PCI bus connection in older designs, or a proprietary interconnect in newer chipsets.

As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 24. Similarly, the RAM 30, hard drive 38, and/or peripheral memory devices may be used to store computer executable instructions comprising an operating system 46, one or more applications programs 48, other program modules 50, and/or program data 52. Still further, computer-executable instructions may be downloaded to one or more of the computing devices as needed, for example, via a network connection.

A user may enter commands and information into the processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as video adapter 62. In addition to the monitor 60, the processing device 20 may also include other peripheral output devices, not shown, such as speakers and printers.

The processing device 20 may also utilize logical connections to one or more remote processing devices, such as a server 64 having a search engine 66 and associated database 68. In this regard, while the remote processing device 64 has been illustrated in the exemplary form of a computer, it will be appreciated that the remote processing device 64 may be any type of device having processing capabilities. Again, it will be appreciated that the remote processing device 64 need not be implemented as a single device but may be implemented in a manner such that the tasks performed by the remote processing device 64 are distributed to a plurality of processing devices linked through a communication network For performing tasks as needed, the remote processing device 64 may include many or all of the elements described above relative to the processing device 20. Communications between the processing device 20 and the remote processing device 64 may be exchanged via a further processing device, such a network router 72, that is responsible for network routing. In this regard, communications with the network router 72 may be performed via a network interface component 73. Thus, within such a networked environment, it will be appreciated that program modules depicted relative to the processing device 20, or portions thereof, may be stored in the memory storage device(s) of the remote processing device 64.

To discern a term for an entry having a spelling error, operations will be performed by the processing devices illustrated in FIG. 1. As such, it will be understood that such operations, which are at times referred to as being computer-executed, include the manipulation by the processing devices of electrical signals representing data in a structured form. This manipulation transforms the data or maintains it at locations in the memory system, which reconfigures or otherwise alters the operation of the processing devices in a manner well understood by those of skill in the art of computer systems. The data structures where data is maintained are physical locations of the memory that have particular properties defined by the format of the data. Nevertheless, while described in the foregoing context, this description is not meant to be limiting as those skilled in the art will further appreciate that various acts and operations described herein may also be implemented, for example, in hardware.

The subject system and method may, for example, be implemented using a tiered architecture where one tier includes a front-end data base and Web applications running on Web server(s) that constitute an interface between users and the back-end, e.g., client machines, of the system. In this manner, authorized users may access the system through a Web browser having a graphical user interface, for example, provided by a Java applet or as a common HTML page. To secure the system, the Web application may be surrounded by a firewall. The application logic would then constitute a further tier and may reside on a cluster of application servers including all of the capabilities necessary to support multiple transactions simultaneously.

For use in discerning if an entry has a spelling error, a dictionary of terms is assembled and "phonetic residues" for those terms may then be created and stored. For example, the dictionary may be comprised of key words commonly utilized to search an e-commerce related electronic catalog such as, but not limited to, brand names, product descriptors, etc. More particularly, the dictionary of terms may be assembled by collecting data pertaining to misspelled key word entries that were not "corrected" by a spell checker that is already associated with a search engine. From this collected data, an inspection can be used to determine which key words were intended by the misspelled entries and these key words can be added to the dictionary of terms. As will be described hereinafter, inspection of the misspelled entries may also be used to determine other rules that may be employed in the process of discerning a term for a misspelled entry.

Figure 2:
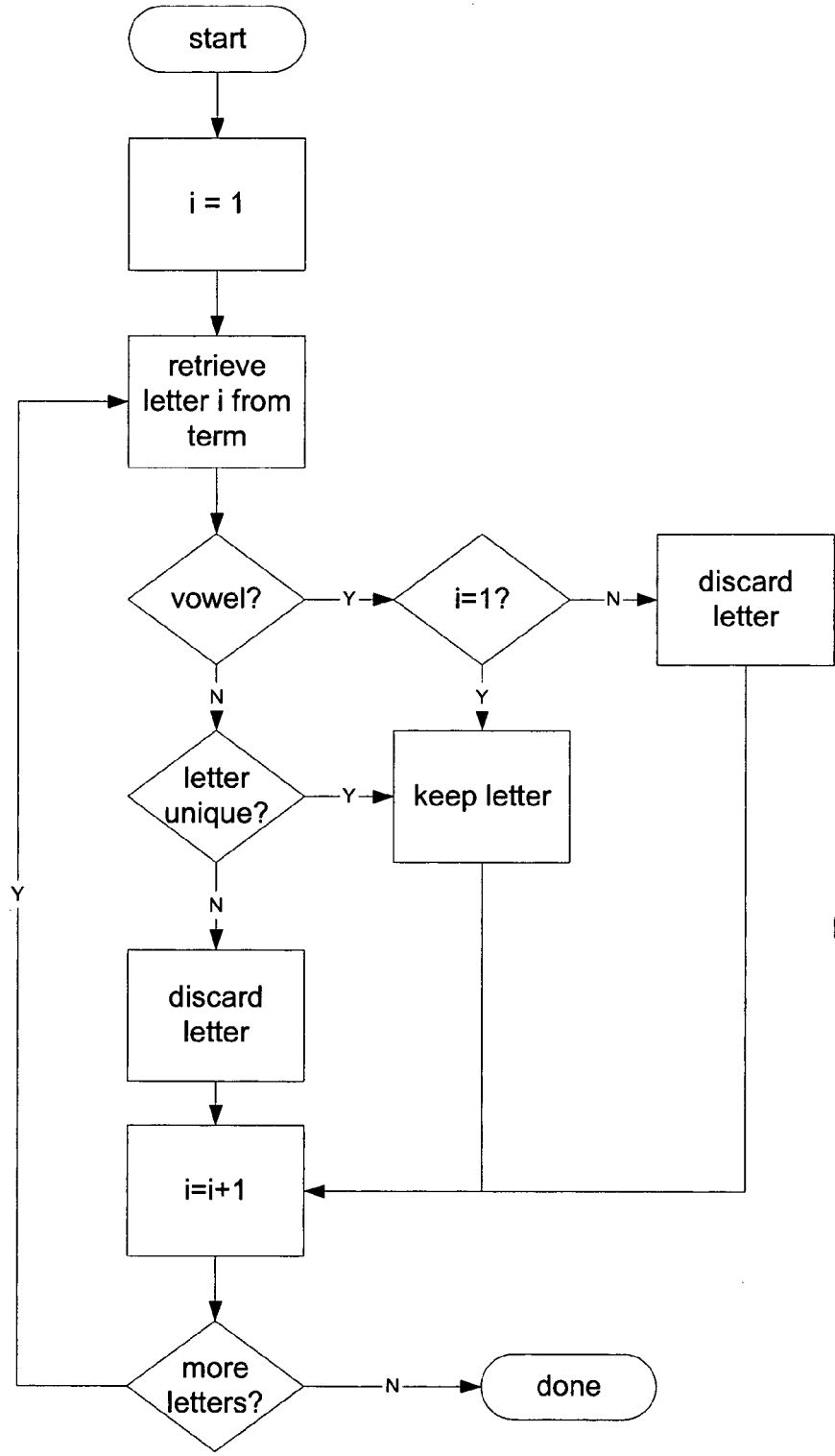
FIG. 2 illustrates a flow chart diagram of an exemplary method for creating a phonetic residue of a term for use in discerning a term for an entry having a spelling error.

Once the dictionary of terms is assembled, a "phonetic residue" for each term may be created by generally following the steps illustrated by way of example in FIG. 2. In particular, a "phonetic residue" of a term may be arrived by evaluating each letter in the term to discern if the letter is a vowel or consonant. Vowels are generally discarded while unique consonants are maintained since the unique consonants are believed to supply the meaningful phonetic information of the respective term. In the case where a vowel is used as a first letter in a term, however, the vowel is also preferably maintained. A "phonetic residue" of a term created in this manner may then be stored in a look-up table as illustrated by way of example in FIG. 3. In such a look-up table, one or more phonetic residues (as will be described hereinafter) are mapped to the term from which they were created. It will be appreciated that such a look-up table may be stored and made accessible on any device within the network.

Figures 3, 4:
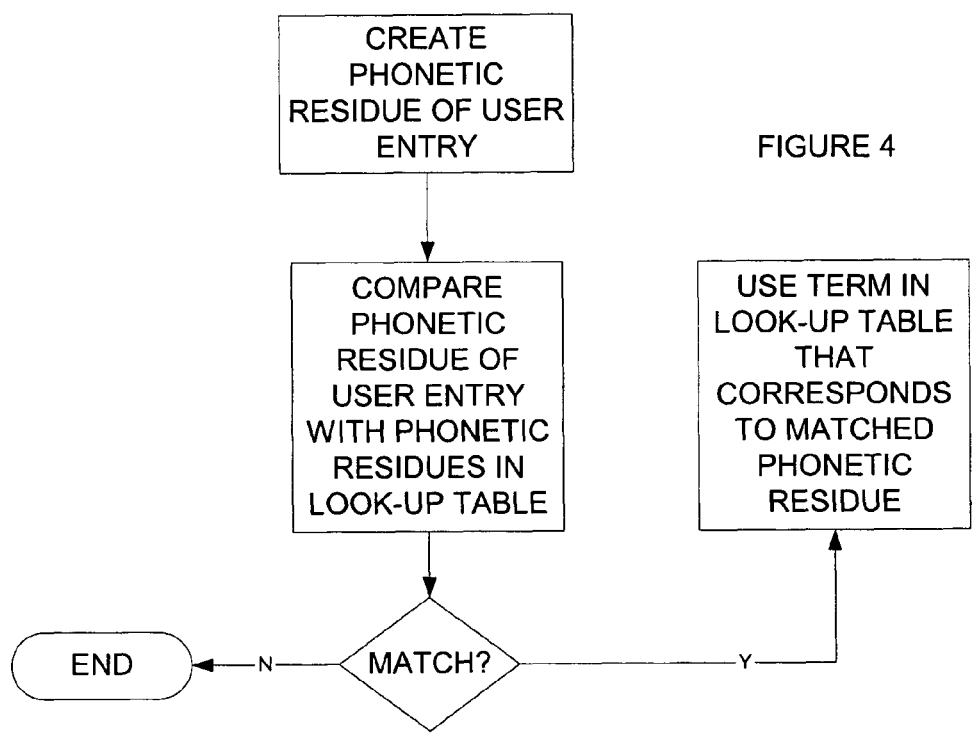
FIG. 3 illustrates an exemplary look-up table having terms and phonetic residues created using the method illustrated in FIG. 2.
FIG. 4 illustrates a flow chart diagram of an exemplary method for using the look-up table of FIG. 3 to find a term for a misspelled user entry.

To use the look-up table to "correct" the spelling of a user entry, for example in the form of a search query, the user entry is preferably subjected to the process generally illustrated in FIG. 2 to create a "phonetic residue" of the user entry. The "phonetic residue" of the user entry may then be compared against the "phonetic residues" of the terms in the look-up table to determine if a match exists. If a match exists, the term mapped to the matched "phonetic residue" may then be substituted for the misspelled user entry as illustrated in FIG. 4 (i.e., this is the term from which the "phonetic residue" was created). In this regard, a match may exist if all of the letters in a "phonetic residue" of a user entry are found in a "phonetic residue" of a dictionary term, without regard to the order of the letters. The ordering of the letters may be used, however, to provide a weight or reliability factor in cases where multiple, similar phonetic residues are present within a look-up table.

Figure 5:
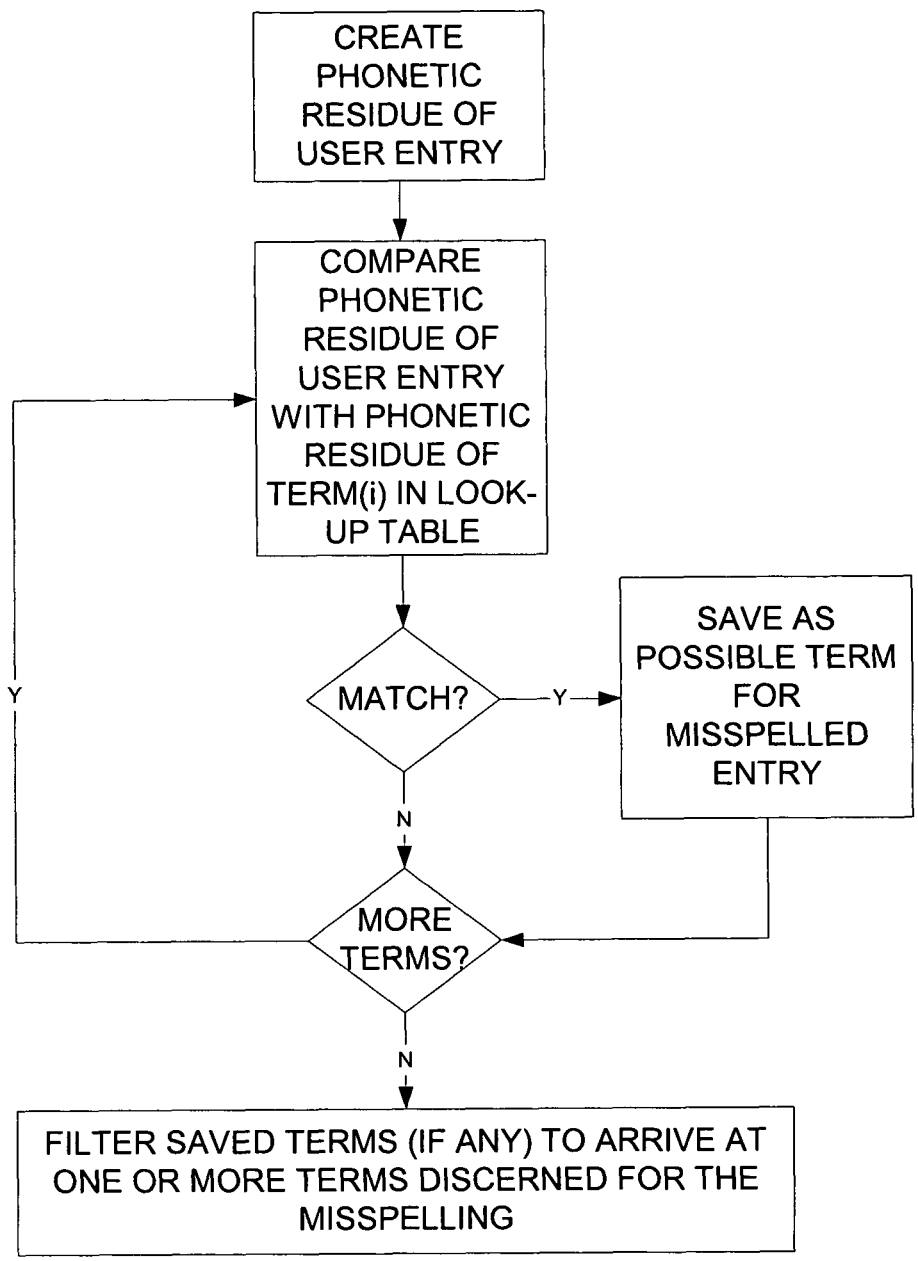
FIG. 5 illustrates a flow chart diagram of a further exemplary method for using the look-up table of FIG. 3 to find a term for a misspelled user entry.

During the process of comparing the phonetic residue of the user entry with the phonetic residues of the terms that comprise the term dictionary, additional rules may be applied. For example, when determining if a match exists between the phonetic residue of the user entry and the "phonetic residue" of a term within the term dictionary, provision may be made to compensate for the user omitting silent letters in the misspelled entry, adding extra letters to the misspelled entry, and/or replacing letters in the misspelled entry with phonetic equivalents. Thus, to compensate for a user misspelling an entry in one or more of these manners, "rules" are preferably made available which specify whether one or more letters may be omitted and/or added to the "phonetic residue" of a term when that "phonetic residue" is utilized during the comparison process as is illustrated in FIG. 5. It will also be appreciated that rules may be derived from pronunciations provided in most commonly available dictionaries.

By way of more specific example, provision may be made for the user to misspell "Milwaukee" by adding an extra "y" to the user entry. That users commonly add a "y" to the misspelled "Milwaukee" may be determined by inspecting collected misspellings data. Thus, the "phonetic residue" for the term "Milwaukee" may be "MLWK" or "MLWKY." In this manner, if the user enters, for example, "Milwakey," the "phonetic residue" of the misspelled entry will be matched to "MLWKY" and the correctly spelled "Milwaukee" may then be substituted for the misspelled "Milwakey." Similarly, provision may be made to modify "phonetic residues" of terms having silent letters by specifying a rule that allows such terms to have alternative "phonetic residues" with the silent letter omitted. For example, with terms having endings of "OW," "CK," or "CHOR," provision may be made to have "phonetic residues" for such terms that omit the "W," the "C," or the "H," respectively—e.g., "Flow Valve" may have alternative "phonetic residues" of "flw vl" or "fl vl" [allowing for a user misspelling "flow" as "flo"] while "Campbell" may have alternative "phonetic residues" of "CMPBL" or "CMBL" [allowing for a user misspelling of "Campbell" by omitting the silent "P"]. Provision may additionally be made to modify "phonetic residues" of terms having letters with phonetic equivalents by specifying a rule that allows such terms to have alternative "phonetic residues" that utilize the phonetic equivalents. For example, with terms containing "PH" provision may be made to have "phonetic residues" that use "F" for the "PH"—e.g., "philosophy" may have alternative "phonetic residues" of "phlsy," "flsy" ["f" being substituted for both "ph"s], or "flsphy" ["f" being substituted for one "ph"]. It will be additionally appreciated that these rules may be combined in cases where terms may have more than one of silent letters, likely added letters, and phonetic equivalents. It will also be appreciated that the look-up table need not store every alternative "phonetic residue" for a term, but that one or more rules may be dynamically applied as needed to "phonetic residues" (e.g., to dynamically add and/or remove letters to the "phonetic residues" of terms within the table) when performing the comparison step.

A still further rule that may be employed before a term is substituted or recommended for a misspelled entry may include a comparison of the first and last consonant (e.g., when examining the letters from left to right) in both the misspelled entry and a term discerned to correspond to the misspelled entry. If these letters match, it can be concluded with a high degree of certainty that the discerned term was the term that was meant by the misspelled entry. This is typically the case since the order of letters appearing between the first and last letters having a consonant sound generally do not carry information that impacts upon an intended meaning of a misspelled word. Thus, such a rule may be employed as a means for reducing the likelihood of falsely recommending a term for a misspelled entry when the "phonetic residue" comparison indicates a likely match, i.e., such a test may be useful as a filter when the "phonetic residue" comparison discerns, for example, one or more terms that may be a likely substitute for a misspelled entry. Yet further rules that may be employed as a means for reducing the likelihood of false recommendations function to compare a pair of consonants at the beginning and/or end of the misspelled entry and a term discerned to correspond to the misspelled entry, if any exist. With respect to these latter rules, it is seen that when a misspelling of an entry occurs, a user is likely to recognize the sound of double consonants at the beginning and/or end of a term and, therefore, such double consonants have a high probability of being included in the misspelled entry for that term. An additional filtering process may function to compare the "phonetic residue" of a misspelled entry against the "phonetic residue" of a candidate term selected from the dictionary of terms considering a blank space which is inserted between letter pairs (adjacent letters) of both "phonetic residues," e.g., the "phonetic residue" of "Milwaukee" would be "mlwk" and, when padded with blanks, would be "m l w k." In this comparison process, the distance between matching letters in the "phonetic residues," considering the blanks, is determined and a score is calculated that is representative of how closely the "phonetic residue" of the misspelled entry matches the "phonetic residue" of the candidate dictionary term. By way of example, scores may be derived using a root-mean-square distance calculation. If a score is achieved that indicates a likely correspondence between the misspelled entry and the candidate dictionary term, the candidate dictionary term may be maintained as a possible substitute for the misspelled entry. If, however, a score is achieved that indicates no likely correspondence between the misspelled entry and the candidate dictionary term, the candidate entry term may be discarded as being unlikely to correspond to what was intended by the misspelled entry. It will be appreciated that one or more of the "phonetic residue" comparison rules may also be applied during any of the described filtering processes, e.g., the first letter (having a consonant sound) of the term "case" may be considered to be both "c" and "k" when performing a comparison with a misspelled entry—the last letter (having a consonant sound) would be "s."

As alluded to previously, the above-described methodology may be utilized in connection with other spelling correction engines, e.g., a spelling correction engine such as described in the background section of this document. In this manner, if the spelling correction engine cannot find an equivalent for a user entry having a misspelling, the above-described methodology may be employed to further attempt to correct a misspelling. When utilized in connection with a currently available spelling correction engine, the dictionary of terms to be used in the look-up table of the subject methodology may be created from a log of user entries that were unable to be corrected using that spelling correction engine.

In operation in the environment illustrated in FIG. 1, the user may enter a search term at processing device 20 to be used in performing a query of a database 68, such as an electronic catalog. Prior to the submission of the user entered search term to the search engine 66, a check may be made to determine if the user misspelled the search term. As previously noted, a first check may be made using a spell checking engine supplied with the search engine 66. If the spell checking engine determines that the user entry is misspelled, the spell checking engine may suggest an alternative entry to the user or automatically supply a "correct" spelling of the user entry to the search engine 66. If the spell checking engine cannot suggest or supply a "correct" spelling of a misspelled entry, the above-described "phonetic residue" methodology may be employed to suggest an alternative entry to the user or automatically supply a "correct" spelling of the user entry to the search engine 66. The "phonetic residue" methodology may additionally include one or more filtering comparisons. If neither the spell checking engine nor the above-described "phonetic residue" methodology is able to discern a "correct" spelling for the word, the word may be maintained in a misspelled word log for later consideration whereby the "phonetic residue" look-up table dictionary and/or rules may be modified so as to catch the same misspelling in the future. The spell checking processes may be performed at the processing device 20, the server 64, and/or distributed within the network. In this manner, the described system and method may be utilized, among other things, to discern a term for an entry having a spelling error to be used to perform a search in an electronic catalog database. It will also be appreciated that the subject system and method may be invoked in lieu of a supplied spell checking process, for example, when it is known that the misspelled entry is not contained within the dictionary of the supplied spell checker.

While various concepts have been described in detail, it will be appreciated by those skilled in the art that various modifications and alternatives to those concepts could be developed in light of the overall teachings of the disclosure. As such, the particular concepts disclosed are meant to be illustrative only and not limiting as to the scope of the invention which is to be given the full breadth of the appended claims and any equivalents thereof.

What is claimed is:

1. A physically embodied computer readable-media having embedded computer executable instructions for discerning a term for a misspelled entry, the instructions performing steps comprising:

creating a phonetic residue of the misspelled entry;

comparing the phonetic residue of the misspelled entry to created phonetic residues of one or more terms in a dictionary of terms; and selecting those terms in the dictionary of terms that have a phonetic residue that substantially matches the phonetic residue of the misspelled entry whereby a selected entry is discerned as a term for the misspelled entry;

wherein the phonetic residue of the misspelled entry and the phonetic residues of the dictionary of terms are created by at least removing all phonetic information provided by non-leading vowels of the misspelled entry and terms in the dictionary of terms, respectively.

2. The computer readable-media as recited in claim 1, wherein a selected term is automatically substituted for the misspelled entry.

3. The computer readable-media as recited in claim 1, wherein a selected term is presented to a user as a possible substitute term for the misspelled entry.

4. The computer readable-media as recited in claim 1, wherein the instructions consider one or more letters that are addable to the phonetic residue of the misspelled entry when comparing and selecting a term from the dictionary of terms.

5. The computer readable-media as recited in claim 1, wherein the instructions consider one or more letters that are ommitable from the phonetic residue of the misspelled entry when comparing and selecting a term from the dictionary of terms.

6. The computer readable-media as recited in claim 5, wherein the one or more letters that are ommitable from the phonetic residue of the misspelled entry comprise one or more consonants that are silent within a term in the dictionary of terms.

7. The computer readable-media as recited in claim 1, wherein the instructions consider one or more letters in the phonetic residue of the misspelled entry that are substituable for one or more letters in the phonetic residue of a term in the dictionary of terms as phonetic equivalents when comparing and selecting a term from the dictionary of terms.

8. The computer readable-media as recited in claim 1, wherein the instructions perform the step of applying a filtering process to a selected term.

9. The computer readable-media as recited in claim 8, wherein the filtering process comprises comparing a first and a last consonant in the misspelled entry with a first and a last consonant in a selected term.

10. The computer readable-media as recited in claim 9, wherein the filtering process considers one or more consonants that are addable to a start or end of the misspelled entry.

11. The computer readable-media as recited in claim 9, wherein the filtering process considers one or more consonants that are substitutable for one or more consonants at a start or end of the misspelled entry.

12. The computer readable-media as recited in claim 9, wherein the filtering process considers one or more consonants that are omittable from a start or end of the misspelled entry.

13. The computer readable-media as recited in claim 8, wherein the filtering process comprises comparing a consonant pair at the start of the misspelled entry and of a selected term.

14. The computer readable-media as recited in claim 8, wherein the filtering process comprises comparing a consonant pair at the end of the misspelled entry and of a selected term.

15. The computer readable-media as recited in claim 8, wherein the filtering process comprises inserting a space between each letter pair in the phonetic residue of the misspelled entry and the phonetic residue of the selected term and determining a score representative of a letter and space distance between at least one letter in the phonetic residue of the misspelled entry and its corresponding letter in the phonetic residue of the selected entry.

16. The computer readable-media as recited in claim 1, wherein the dictionary of terms comprises terms representative of attributes of products in an electronic catalog.

17. The computer readable-media as recited in claim 1, wherein a selected term is provided to a search engine.

* * * * *